United States Patent

King et al.

[15] 3,677,062
[45] July 18, 1972

[54] PARACHUTE ACTUATOR TESTING APPARATUS

[72] Inventors: James Robert King, Van Nuys; Gerald D. Myers, Sepulveda, both of Calif.

[73] Assignee: King Nutronics Corporation, Van Nuys, Calif.

[22] Filed: Jan. 28, 1971

[21] Appl. No.: 110,549

[52] U.S. Cl. .......................................................73/4 R, 73/37
[51] Int. Cl. ..........................................73 432 SD, G01x 27/00
[58] Field of Search ..............................73/4 R, 5, 37, 432 SP

[56] References Cited

UNITED STATES PATENTS

| | | |
|---|---|---|
| 2,411,355 | 11/1946 | Beiser et al. ....................................73/5 |
| 2,478,938 | 8/1949 | Osterhus ..................................... 73/4 R |

*Primary Examiner*—Louis R. Prince
*Assistant Examiner*—Frederick Shoon
*Attorney*—Harris, Kiech, Russell & Kern

[57] ABSTRACT

A testing apparatus for an altitude-sensitive parachute actuator, comprising an altitude chamber adapted to support the parachute actuator therein, a vacuum pump connected to the chamber, an on-off vacuum valve interposed between the pump and the chamber, an altimeter connected to the chamber to indicate the altitude therein, an on-off vent valve connected to the chamber to vent same to the atmosphere when open, and a vent restriction in series with the vent valve. The vent valve is a snap-acting toggle valve which can be closed substantially instantaneously when the parachute actuator is triggered so as to stop the altimeter at substantially the triggering altitude. The vent restriction is of a size to bleed air into the chamber, when the vent valve is open, at a rate corresponding to the rate of descent of a parachutist in free fall, i.e., a rate of descent of the order of 100 to 250 feet per second, and preferably about 180 feet per second.

6 Claims, 6 Drawing Figures

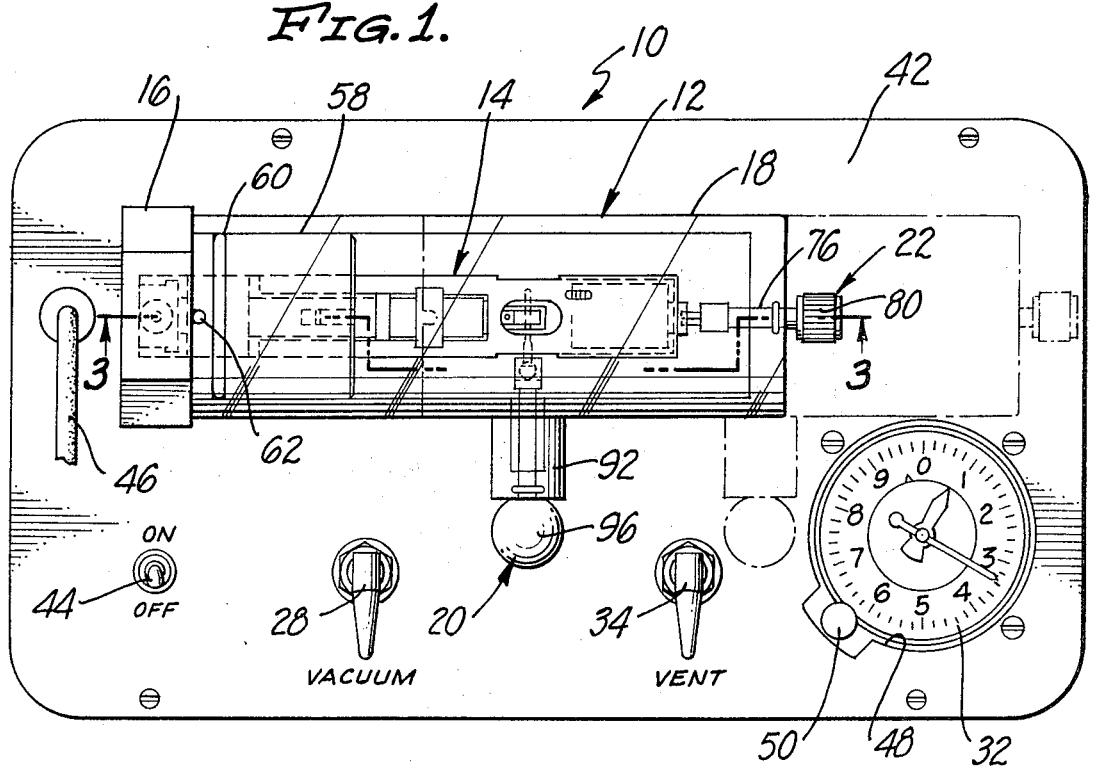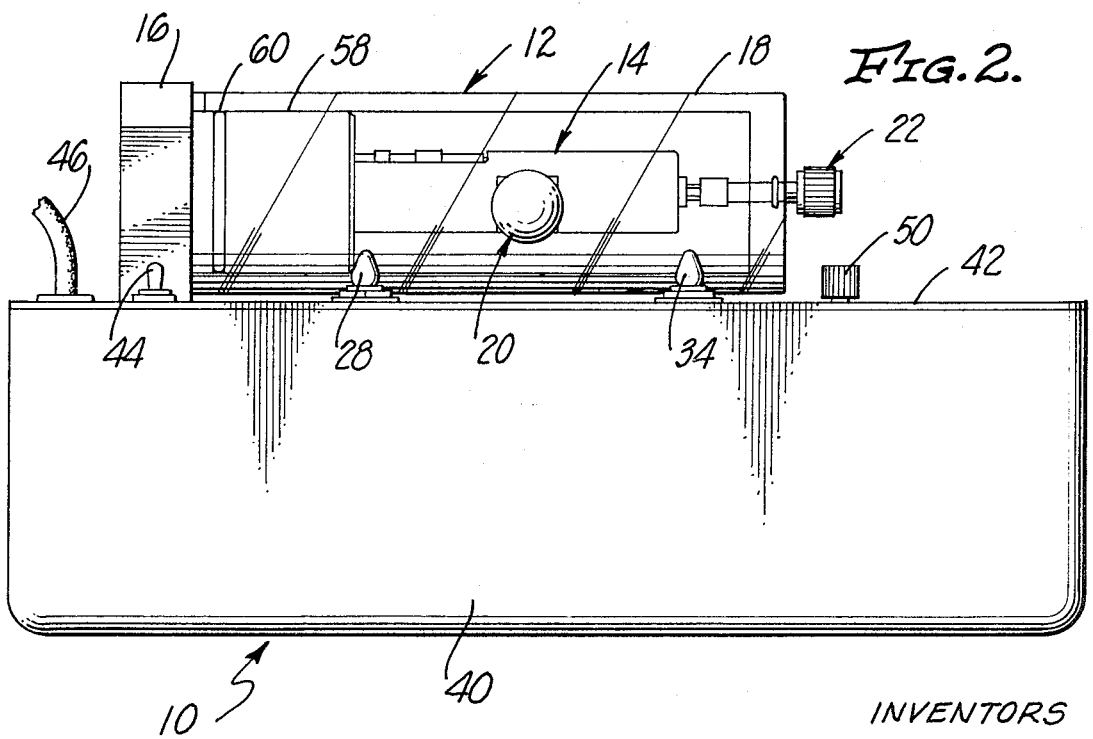

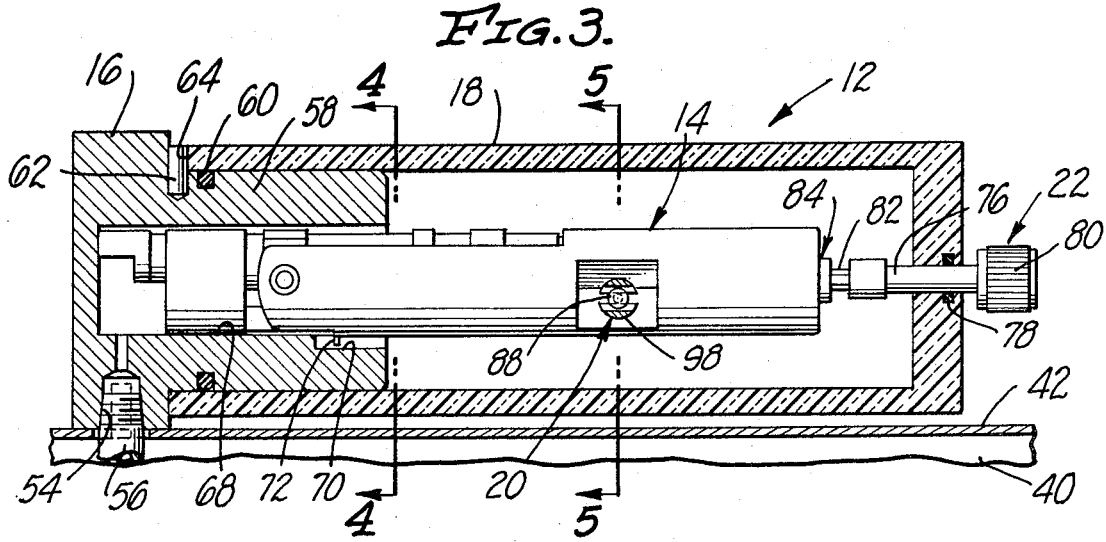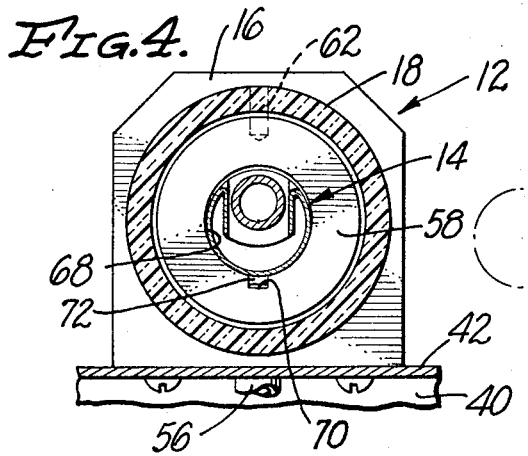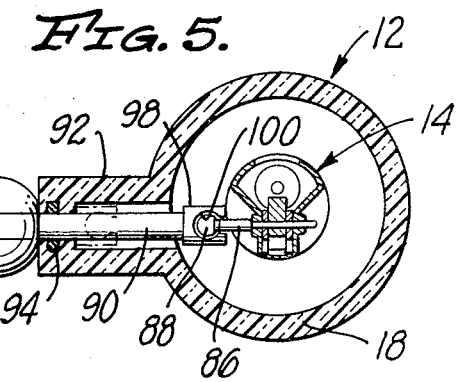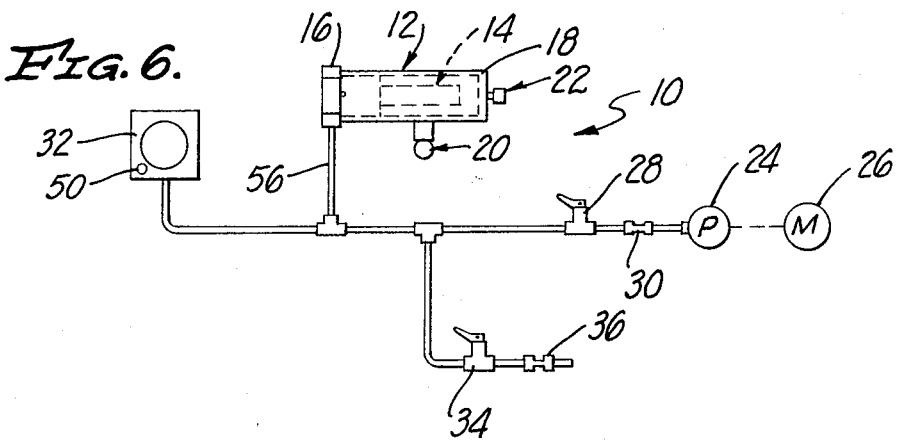

3,677,062

PARACHUTE ACTUATOR TESTING APPARATUS

BACKGROUND OF INVENTION

The present invention relates in general to an apparatus for testing an altitude-sensitive actuator for automatically opening a parachute when the parachutist reaches a predetermined altitude, e.g., 14,000 feet, in free fall.

Ideally, every parachute actuator should be tested every time the parachute with which it is used is repacked. However, this is frequently not done because of the inaccessibility of testing equipment.

The altitude chambers conventionally used in testing parachute actuators are not available in many areas and, as a consequence, testing parachute actuators therein frequently requires shipment of the actuators to a location where one is available, which is obviously expensive and time consuming. The result is that parachute actuators are normally not tested as often as it is advisable, with the potential result that malfunctioning may occur.

SUMMARY AND OBJECTS OF INVENTION

With the foregoing background in mind8c the primary object of the invention is to provide a parachute actuator testing apparatus having the form of a small and inexpensive testing kit which can readily be made available to anyone repacking parachutes at relatively little cost. More particularly, an important object is to provide a portable tester weighing but a few pounds which can be carried readily in one hand and which can be placed in operation in but a few moments.

The invention may be summarized as including, and another object is to provide a parachute actuator testing apparatus which includes: an altitude chamber of a size to receive a parachute actuator therein and having means for supporting the actuator; a vacuum pump connected to the chamber and driven by an electric motor; a vacuum valve in series with the pump, and between the pump and the chamber, and adapted when closed, to maintain a vacuum in the chamber; an altimeter connected to the chamber for indicating the effective altitude therein; and a vent valve connected to the chamber and adapted, when opened, to admit air thereinto to simulate a decreasing altitude so as to trigger the actuator when the altitude for which it is set is reached, if the actuator is operating properly.

An important object of the invention is to provide an on-off vent valve of the snap-acting toggle type which closes substantially instantaneously. Consequently, when the operator closes the vent valve upon triggering of the parachute actuator, the altimeter is stopped substantially at the triggering altitude. This enables the operator to read the altimeter while stationary, there being no need for him to try to read a moving altimeter upon triggering of the actuator, which is an important feature.

Another important object of the invention is to provide a vent restriction, in series with the vent valve, which is of a size to bleed air into the chamber, when the vent valve is open, at a rate corresponding to a rate of descent comparable to that of a parachutist in free fall in the vicinity of the triggering altitude, i.e., a rate of descent of the order of 100 to 250 feet per second, and preferably about 180 feet per second. This insures simulating the actual conditions under which the parachute actuator is used.

Summarizing the present invention still more specifically, an important object thereof is to provide a parachute actuator altitude chamber which includes: a base; a transparent cylinder having an open end telescopically connected to the base; a socket in the base coaxial with the cylinder and adapted to receive one end of the parachute actuator and to support the actuator; laterally movable means carried by the cylinder intermediate its ends, and engageable with the arming pin of the actuator, for retracting the arming pin so as to prepare the actuator for triggering at a predetermined altitude during simulated descent; and rotatable means coaxial with and carried by the closed end of the cylinder, and engageable with the altitude adjustment means of the actuator, for adjusting the triggering altitude.

Another object is to provide indexing means for establishing a predetermined angular position of the actuator relative to the base and of the cylinder relative to the base, whereby the laterally movable means for pulling the arming pin is properly indexed angularly relative to the arming pin.

A further object is to provide a construction wherein the arming pin has a spherical knob and the laterally movable pulling means as a keyhole-shaped slot to receive the spherical knob, and the adjacent portion of the arming pin, as the cylinder is telescopically connected to the base.

Yet another object of the invention is to provide in the base a port which communicates with the interior of the cylinder and to which are connected the vacuum pump and vacuum valve, the altimeter and the vent valve and vent restriction.

The foregoing objects, advantages, features and results of the present invention, together with various other objects, advantages, features and results thereof which will be evident to those skilled in the parachute actuator testing art in the light of this disclosure, may be achieved with the exemplary embodiment of the invention illustrated in the accompanying drawings and described in detail hereinafter.

DESCRIPTION OF DRAWINGS

In the drawings:

FIG. 1 is a plan view of a parachute actuator testing apparatus or kit which embodies the invention;

FIG. 2 is a front elevational view thereof;

FIG. 3 is a longitudinal sectional view of an altitude chamber forming part of the apparatus, FIG. 3 being taken as indicated by the arrowed line 3—3 of FIG. 1, and shows a parachute actuator to be tested in place within the altitude chamber;

FIGS. 4 and 5 are transverse sectional views respectively taken as indicated by the arrowed lines 4—4 and 5—5 of FIG. 3; and FIG. 6 is a diagrammatic view illustrating the vacuum circuitry of the tester.

DESCRIPTION OF EXEMPLARY EMBODIMENT OF INVENTION

Referring initially to FIG 6 of the drawings, the parachute actuator testing apparatus or kit of the invention is designated generally therein by the numeral 10 and includes an altitude chamber 12 adapted to receive therein and to support therein a parachute actuator 14. As will be described in more detail hereinafter, the altitude chamber 12 includes a base 16 having telescoped thereonto the open end of a transparent cylinder 18, the latter carrying intermediate its ends a laterally movable means 20 for pulling the arming pin of the parachute actuator, and carrying at its closed end a coaxial rotatable means 22 for adjusting the altitude adjustment means of the actuator.

Communicating with the interior of the altitude chamber 12 is a vacuum pump 24 driven by an electric motor 26. In series with the vacuum pump 24, and disposed between it and the altitude chamber 12, are an on-off vacuum valve 28 of the snap-acting toggle type and a vacuum restriction 30, which may be an orifice, for limiting the rate at which the altitude in the chamber 12 is increased. Also connected to the altitude chamber 12 are a conventional altimeter 32, an on-off vent valve 34 of the snap-acting toggle type, and a vent restriction 36, such as an orifice, in series with the vent valve.

Considering the operation of the tester 10 as thus far described, the parachute actuator 14 is placed in the altitude chamber 12 with the pulling means 20 engaging the arming pin of the actuator, and with the adjusting means 22 engaging the altitude adjustment means of the actuator, all as will be described in more detail hereinafter. Then, with the motor 26 energized to drive the vacuum pump 24, and with the vacuum valve 28 open and the vent valve 34 closed, the pressure in the altitude chamber 12 is reduced to an effective altitude considerably higher then that for which the parachute actuator 14 is set. For example, if the triggering altitude of the parachute actuator 14 is 14,000 feet, the effective altitude in the chamber 12 may be elevated to 20,000 feet to 25,000 feet. This requires but a short period of time. e.g., about 15 seconds.

The foregoing operations completed, the vacuum valve 28 is closed, the vacuum pump 24 is stopped, and the arming pin of the parachute actuator 14 is pulled, utilizing the pulling means 20. The tester 10 is now ready for simulated descent.

The vent valve 34 is then opened to bleed ambient air into the altitude chamber 12. The vent restriction 36 is of a size to bleed air into the altitude chamber 12 at a rate corresponding to the rate of descent of a parachutist in free fall. This simulates the actual conditions under which the parachute actuator 14 is required to operate. Preferably, as the altitude decreases to about 16,000 feet, a colored sector, not shown, is exposed on the face of the altimeter 32 to altert the operator that the triggering altitude for alert parachute actuator 14 is approaching, assuming a triggering altitude of 14,000 feet.

Assuming that the parachute actuator 14 is operating properly, it will be triggered when the altimeter 32 indicates about 14,000 feet. When the operator hears the triggering of the parachute actuator 14, he immediately closes the vent valve 34. Since this is a snap-acting toggle valve, it closes substantially instantaneously so that the indication provided by the altimeter 32 is substantially equal to that at which the parachute actuator 14 was triggered. The operator may now read the stationary altimeter 32 at his convenience, there being no necessity for him to attempt to read the altimeter while the hands thereof are moving, which is an important feature of the invention.

After reading the altimeter 32, the operator may increase the pressure in the altitude chamber 12 to atmospheric very rapidly by opening the vacuum valve 28.

If the altitude at which the parachute actuator 14 was triggered was incorrect, the operator may rectify this by rotating the adjusting means 22 in the proper direction, and then repeating the test.

Turning now to a consideration of the physical structure of the parachute actuator tester 10, it includes a housing 40 which may be about the size of a small tool box and which may be provided with a cover, not shown, having a carrying handle. The housing 40 is provided with a deck 42 on which the altitude chamber 12 is mounted, or, more accurately, on which the base 16 of the altitude chamber is mounted. The vacuum valve 28, the vent valve 34, and an on-off switch 44 for the motor 26, are carried by the deck 42 therebeneath, with their actuating levers accessible above the deck. The motor 26 is located beneath the deck 42, preferably being carried thereby, and power to operate the motor is provided through an extension cord 46 which extends downwardly through the deck 42 and which may be plugged into any 110-volt outlet.

The vacuum pump 24 driven by the motor 26 is also mounted on the deck 42 therebeneath, as are the vacuum and vent restrictions 30 and 36. The altimeter 32 is also located beneath and mounted on the deck 42 with its face visible through an opening 48 in the deck and with its adjustment knob 50 accessible from above the deck Preferably, the knob 50 is immobilized with the altimeter 32 preset to a barometric pressure of 29.92 inches Hg.

Mounting all of the components of the tester 10 on the deck 42 as hereinbefore outlined is desirable from a servicing and repair standpoint since all components are exposed simply by removing the deck from the housing 40, which is an important feature.

Considering the altitude chamber 12 in more detail, its base 16, as hereinbefore indicated, is suitably secured to the deck 42 on the upper side thereof. The base 16 is provided with a port 54 to which is connected a line 56 leading to the various hereinbefore-described components of the vacuum circuit, as illustrated in FIG. 6 of the drawings, The base 16 is provided with a horizontally oriented, cylindrical projection 58 onto which the open end of the transparent cylinder 18 is telescoped, a vacuum-tight seal therebetween being maintained by an O-ring 60 carried by an annular groove in the cylindrical projection 58 and engageable with the interior of the cylinder. An indexing means, comprising a radial pin 62 carried by the base 16 and a complementary notch 64 in the open end of the cylinder 18, establishes a predetermined angular orientation of the cylinder relative to the base.

The cylindrical projection 58 on the base 16 is provided therein with a coaxial socket 68 which receives one end of the parachute actuator 14 and which supports the actuator. A longitudinal groove 70 on one side of the socket 68 receives a lug 72 on the parachute actuator 14 to index the parachute actuator angularly relative to the base 16 and the cylinder 18.

The adjusting means 22 comprises a coaxial shaft 76 which extends through the closed end of the cylinder 18 and which is sealed by an O-ring 78. The shaft 76 is provided at its outer end with a knob 80 and is provided with a hexagonal inner end 82 insertable into an altitude adjustment means 84 with which the parachute actuator 14 is conventionally equipped. As will be apparent, by rotating the knob 80, the altitude setting of the parachute actuator 14 may be adjusted to the desired value, e.g., 14,000 feet.

The arming pin with which the parachute actuator 14 is conventionally equipped is replaced by a dummy arming pin 86, FIG. 5, which is shorter than the conventional arming pin and which terminates at its outer end in a spherical knob 88 engageable by the laterally movable pulling means 20. The latter comprises a shaft 90 disposed in a tubular lateral extension 92 of the cylinder 18 and extending outwardly through the end wall of such extension, an O-ring 94 maintaining a vacuum tight seal. The shaft 90 is equipped with a manually graspable knob 96 at its outer end. The shaft is provided at its inner end with an enlargement 98 which is engageable with the knob 88 on the arming pin 86 to pull it and which is also engageable with the outer end of the tubular extension 92 of the cylinder 18 to limit outward movement. The enlargement 98 is provided therein with a keyhole-shaped slot 100 which receives the knob 88 on the arming pin 86 and the adjacent portion of the arming pin. As will be apparent, when the cylinder 18 is installed on the base 16 with the parachute actuator 14 positioned in the socket 68, the knob 88 and the adjacent portion of the arming pin 86 will automatically enter the keyhole-shaped slot 100 with the pulling means 20 in the position shown in solid lines in FIG. 5 of the drawings.

It will be understood that the cylinder 18 requires no support other than that provided by its telescoping relation with the base 16, since the vacuum developed in the altitude chamber 12 will firmly seat the open end of the cylinder against the base around the cylindrical projection 58 on the base.

In addition to replacing the regular arming pin of the parachute actuator 14 with the dummy 86, the regular live cartridge is also replaced with a dummy (not shown). If desired, the base 16 may be provided with sockets (not shown) for storing the dummy arming pin and cartridge.

Since the operation of the tester 10 has already been described in connection with FIG. 6 of the drawings, and since the modes of operation of the detailed structures subsequently described will be clear to those skilled in the art, no further explanation of the operation of the tester is necessary.

Although an exemplary embodiment of the invention has been disclosed for purposes of illustration, it will be understood that various changes, modifications, and substitutions may be incorporated in such embodiment without departing from the spirit of the invention as defined by the claims appearing hereinafter.

We claim as our invention:

1. In a parachute actuator testing apparatus, the combination of:

a. an altitude chamber adapted to receive a parachute actuator therein;

b. a vacuum pump connected to said chamber;
c. an altimeter connected to said chamber;
d. a vent valve connected to said chamber;
e. a vent restriction in series with said vent valve; and
f. said vent valve being a snap-acting toggle valve which stops said altimeter substantially instantaneously when it is closed.

2. A parachute actuator testing apparatus according to claim 1 wherein said restriction is of a size to bleed air into said chamber, when said vent valve is open, at a rate corresponding to a rate of descent of the order of 100 to 250 feet per second.

3. In a parachute actuator testing apparatus, an altitude chamber adapted to receive a parachute actuator having an altitude adjustment means at one end and having a laterally retractable arming pin intermediate its ends, said altitude chamber including:
a. a base;
b. a transparent cylinder having an open end telescopically connected to said base;
c. said base having a port communicating with said cylinder and having a socket coaxial with said cylinder and adapted to receive the other end of and to support the actuator;
d. laterally movable means carried by said cylinder intermediate its ends, and engageable with the arming pin of the actuator, for retracting the arming pin; and
e. rotatable means coaxial with and carried by the closed end of said cylinder, and engageable with the adjustment means of the actuator, for adjusting the adjustment means.

4. A parachute actuator testing apparatus according to claim 3 including indexing means on said base and said cylinder for establishing a predetermined angular position of said cylinder relative to said base, and indexing means for establishing a predetermined angular position of the actuator relative to said base.

5. A parachute actuator testing apparatus as defined in claim 4 wherein the arming pin has a spherical knob and said laterally movable means has a keyhole-shaped slot to receive the spherical knob on the arming pin and the portion of the arming pin adjacent the spherical knob, as said cylinder is telescopically connected to said base.

6. A parachute actuator testing apparatus as set forth in claim 3 wherein said inlet port has connected thereto the following:
a. a vacuum valve;
b. a vacuum pump in series with said vacuum valve;
c. an altimeter;
d. a vent valve; and
e. a vent restriction in series with said vent valve, said restriction being of a size to bleed air into said chamber, when said vent valve is open, at a rate corresponding to a rate of descent of the order of 100 to 250 per second.

* * * * *